(12) United States Patent
Benedetto et al.

(10) Patent No.: US 9,896,774 B2
(45) Date of Patent: Feb. 20, 2018

(54) ELECTROLYTIC CELL FOR THE PRODUCTION OF OXIDISING SOLUTIONS

(71) Applicant: INDUSTRIE DE NORA S.P.A., Milan (IT)

(72) Inventors: Mariachiara Benedetto, Milan (IT); Yoshinori Nishiki, Fujisawa (JP)

(73) Assignee: INDUSTRIE DE NORA S.P.A., Milan (IT)

( * ) Notice: Subject to any disclaimer, the term of this patent is extended or adjusted under 35 U.S.C. 154(b) by 155 days.

(21) Appl. No.: 15/022,110

(22) PCT Filed: Sep. 15, 2014

(86) PCT No.: PCT/EP2014/069610
§ 371 (c)(1),
(2) Date: Mar. 15, 2016

(87) PCT Pub. No.: WO2015/036591
PCT Pub. Date: Mar. 19, 2015

(65) Prior Publication Data
US 2016/0222529 A1      Aug. 4, 2016

(30) Foreign Application Priority Data

Sep. 16, 2013   (IT) .......................... MI2013A001521

(51) Int. Cl.
| | |
|---|---|
| *C02F 1/46* | (2006.01) |
| *C25B 9/10* | (2006.01) |
| *C02F 1/461* | (2006.01) |
| *C25B 1/26* | (2006.01) |
| *C25B 15/08* | (2006.01) |
| *C25B 9/08* | (2006.01) |

(Continued)

(52) U.S. Cl.
CPC .............. *C25B 9/10* (2013.01); *C02F 1/4618* (2013.01); *C25B 1/26* (2013.01); *C25B 9/08* (2013.01); *C25B 11/03* (2013.01); *C25B 11/0405* (2013.01); *C25B 11/0415* (2013.01); *C25B 11/0484* (2013.01); *C25B 13/02* (2013.01); *C25B 13/04* (2013.01); *C25B 13/08* (2013.01); *C25B 15/08* (2013.01); *C02F 1/4693* (2013.01); *C02F 2001/46142* (2013.01); *C02F 2001/46185* (2013.01); *C02F 2201/4614* (2013.01); *C02F 2201/46115* (2013.01); *C02F 2201/46145* (2013.01); *C02F 2209/06* (2013.01)

(58) Field of Classification Search
None
See application file for complete search history.

(56) References Cited

U.S. PATENT DOCUMENTS

| | | | | |
|---|---|---|---|---|
| 4,170,539 | A * | 10/1979 | Simmons | ................ C25B 13/04 204/295 |
| 5,755,951 | A | 5/1998 | Kroner et al. | |
| 2006/0260931 | A1 | 11/2006 | Sano | |

FOREIGN PATENT DOCUMENTS

JP         2012110809 A        6/2012

OTHER PUBLICATIONS

International Search Report for International Application No. PCT/EP2014/069610.(dated Jan. 20, 2015) (2 Pages).

* cited by examiner

*Primary Examiner* — Arun S Phasge
(74) *Attorney, Agent, or Firm* — Lucas & Mercanti, LLP

(57) ABSTRACT

A three-compartment cell for production of oxidising disinfectant solutions is provided. The intermediate compart- (Continued)

ment of the cell is separated from the anodic compartment by a fibrous diaphragm in intimate contact with an anion-exchange membrane.

9 Claims, 1 Drawing Sheet

(51) Int. Cl.
*C25B 13/04* (2006.01)
*C25B 11/03* (2006.01)
*C25B 11/04* (2006.01)
*C25B 13/02* (2006.01)
*C25B 13/08* (2006.01)
*C02F 1/469* (2006.01)

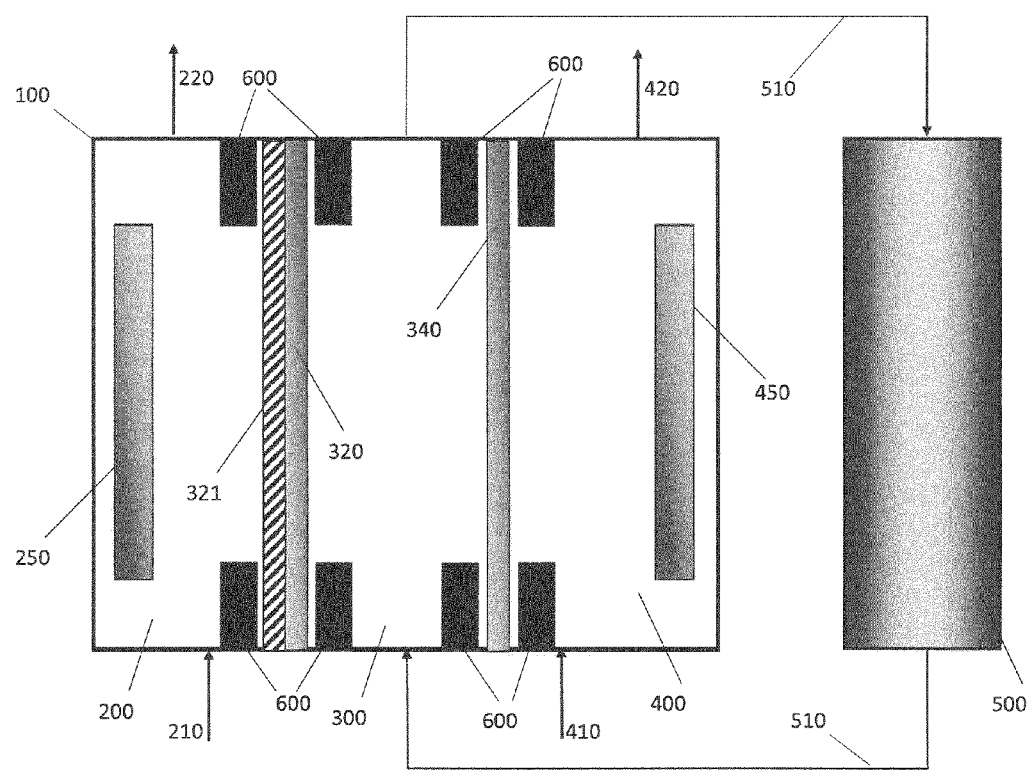

ELECTROLYTIC CELL FOR THE PRODUCTION OF OXIDISING SOLUTIONS

This application is a U.S. national stage of PCT/EP2014/069610 filed on Sep. 15, 2014 which claims the benefit of priority from Italian Patent Application No. MI2013A001521 filed Sep. 16, 2013 the contents of each of which are incorporated herein by reference.

SUMMARY OF THE INVENTION

The invention relates to a three compartment electrolytic cell for the production of oxidising solutions with disinfecting power containing active chlorine.

BACKGROUND OF THE INVENTION

The use of mildly acidic solutions containing active chlorine, mostly in the form of hypochlorous acid, is known in various disinfection processes pertaining to several industrial fields including healthcare and sanitary applications; in food industry for instance, this kind of solutions are employed for the elimination of pathogenic bacteria such as *Salmonella* or *Escherichia coli* from the manufacturing cycle of foods of various kinds. The continuous production of solutions containing free active chlorine at appropriate concentration (e.g. 50-100 ppm) may be carried out electrolytically in unseparated or in two-compartment cells, i.e. in cells partitioned by a semipermeable diaphragm or cation-exchange membrane and fed with alkali chloride brine; in the latter case, the desired solution is generated in the anodic compartment, while at the corresponding cathodic compartment an alkaline solution with good cleansing properties is obtained. In such systems, however, the salinity of the resulting anodic product is too high to be suitable for use in many of the typical fields of application (food industry, hospitals, agriculture). An anodic product of superior quality can be obtained with an electrolytic cell equipped with three compartments, with a circulation of concentrated brine in an intermediate compartment, separated from the cathodic compartment by a cation-exchange membrane and from the anodic compartment by an anion-exchange membrane. The above selection of separators allows the selective migration of sodium ions to the cathodic compartment, where a diluted alkali solution is generated (e.g. 50-100 ppm of caustic soda when the brine consists of sodium chloride) and of chloride ions to the anodic compartment, where chlorine is generated. None of the commercially available anionic membranes, however, is capable of resisting the attack of chlorine-containing acidic solutions for more than a few tens of hours, despite their alleged resistance to oxidants; maintenance costs for the replacement of anionic membranes in three-compartment cells have hence proven not well suited to the needs of industry.

It was thus identified the need to provide an electrolytic cell for the production of acidic solutions containing active chlorine overcoming the drawbacks of the prior art, especially in terms of durability of the components.

SUMMARY OF THE INVENTION

Various aspects of the invention are set out in the accompanying claims. Under one aspect, the invention relates to an electrolytic cell for the production of oxidising solutions with disinfectant properties comprising an anodic compartment and a cathodic compartment with an intermediate compartment interposed therebetween delimited by an anodic separator and a cathodic separator; the cathodic separator, which separates the cathodic compartment from the intermediate compartment, consists of a cation-exchange membrane, while the anodic separator, which separates the anodic compartment from the intermediate compartment, comprises a diaphragm consisting of a network of fibres of organic polymer mechanically bound to particles of ceramic material. In one embodiment, the diaphragm used as the anodic separator is applied to or otherwise arranged in intimate contact with an anion-exchange membrane. In one embodiment, the diaphragm consists of a composite tape of perfluorinated polymer and zirconium oxide with a thickness ranging between 0.1 and 1 mm, for example similarly to the product commercialised by Industrie De Nora as Polyramix® Tape. This type of material has the advantage of being suitable for being arranged in multiple superposed layers until the desired thickness is obtained; additionally, it can act directly as the separator or it may be directly applied either to both sides of an anion-exchange membrane or to a single side thereof, which in one embodiment is the one facing the anodic compartment. Diaphragms of this kind may be obtained by deposition into thin sheets of suspended polymeric fibres whereupon ceramic particles are previously impacted by mechanical means, with subsequent sintering and hydration. The deposition can take place according to procedures typical of the paper industry (for instance, by filtration on a suitable porous matrix). These diaphragms have proven surprisingly suitable for imparting high chemical resistance characteristics to the commonest anion-exchange membranes, meanwhile enhancing their selectivity. In one embodiment, the anodic compartment is provided with means for feeding softened water, for example water of hardness not exceeding 7° f, and with means for extracting the mildly acidic oxidising solution, for example at a pH between 4 and 6.9, containing free active chlorine; the cathodic compartment is provided with means for feeding softened water similarly to the anodic compartment and with means for extracting an alkaline catholyte, for example a caustic soda solution at a pH between 9 and 11; the intermediate compartment is provided with means for recycling an alkali chloride brine, for example a saturated sodium chloride brine.

Under another aspect, the invention relates to a method for the production of an active chlorine-containing oxidising solution with disinfectant power in a cell as hereinbefore described, comprising feeding water, optionally softened water of hardness not exceeding 7° f, to the anodic compartment and optionally to the cathodic compartment, recycling alkali chloride brine, optionally a saturated sodium chloride aqueous solution, through the intermediate compartment, feeding direct electric current between the anodic compartment—connected to the positive pole of a power supply unit—and the cathodic compartment, connected to the negative pole and extracting the product oxidising solution from the anodic compartment. In one embodiment, the recycling of alkali chloride brine through the intermediate compartment is carried out through an external reservoir containing a decomposition catalyst, for example based on $RuO_2$ or $Co_3O_4$. This can have the advantage of reducing the content of free chlorine in the intermediate compartment, contributing to the protection of the anionic membrane especially in the case where the polymer diaphragm is applied only to the side of the membrane facing the anodic compartment. The $RuO_2$ or $Co_3O_4$ catalyst is particularly fit for this purpose because it can be introduced into the tank in form of a catalytic coating applied to appropriate components thereof, for instance to plates made of titanium or other suitable material inserted into the tank. Other decomposition catalysts capable of reducing the levels of free chlorine in the recycled brine can be used without departing from the scope of the invention.

Some implementations exemplifying the invention will now be described with reference to the attached drawing, which has the sole purpose of illustrating the reciprocal arrangement of the different elements relatively to said particular implementations of the invention; in particular, drawings are not necessarily drawn to scale.

BRIEF DESCRIPTION OF THE DRAWING

FIG. 1 shows a diagram of the electrolytic cell according to one embodiment of the invention.

DETAILED DESCRIPTION OF THE DRAWING

FIG. 1 shows a side view of an electrolytic cell 100 according to one embodiment of the invention, subdivided into three compartments respectively consisting of an anodic compartment 200 and a cathodic compartment 400 with an intermediate compartment 300 interposed therebetween. The anodic compartment 200 contains an anode 250 and is separated from intermediate compartment 300 by means of a polymer diaphragm 321 applied to a anion-exchange membrane 320 on the side facing anodic compartment 200. Cathodic compartment 400 contains a cathode 450 and is separated from intermediate compartment 300 by means of a cation-exchange membrane 340. The sealing between the various compartments is ensured by means of a gasketing system 600. Within intermediate compartment 300 a saturated solution of sodium chloride or other type of alkali chloride brine 510 is recycled with the aid of tank 500. Inside tank 500 a decomposition catalyst is optionally contained, for example, ruthenium dioxide applied as coating of a metallic component (not shown).

Anodic compartment 200 is supplied with softened water 210 through appropriate supply means (not shown); from the same compartment, product oxidising solution 220 containing free active chlorine at slightly acidic pH is extracted. Cathodic compartment 400 is also fed with softened water 410; in one embodiment, softened water feed 210 and 410 to anodic compartment 200 (anolyte in the following) and to cathodic compartment 400 (catholyte in the following), respectively, are unified. In another embodiment, only anodic compartment 200 is supplied with softened water 210. A dilute alkali solution with negligible salinity 420 is extracted from cathodic compartment 400, suitable for use as a cleaning agent in many industrial applications.

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

Example

An electrolytic cell according to the scheme shown in the FIGURE was assembled using an anode 250 consisting of a 0.5 mm thick titanium mesh with an area of 113 mm×53 mm, activated with a catalytic coating based on oxides of Ru, Ir and Ti; a cathode 450 consisting of a 0.5 mm thick titanium mesh with an area of 113 mm×53 mm, activated with a catalytic coating based on Pt; a cation-exchange membrane 340 of Nafion® N115 type, produced by DuPont; an anodic separator comprising an anion-exchange membrane 320 of FAP-0 type, produced by Fumatec, with two layers of 0.5 mm thick polymer diaphragm tape 321 of the Polyramix® Tape type by Industrie De Nora superimposed thereto on the side facing anodic compartment 200, consisting of a network of PTFE fibres modified with Zr particles obtained by deposition of a thin sheet from an aqueous suspension of fibres, drying at 100° C., sintering at 345° C. for 90 minutes and conditioning for 60 minutes in dilute caustic soda at pH 11 containing 0.1% of Zonyl® surfactant at a temperature of 90° C. Anodic compartment 200 and cathodic compartment 400 were fed respectively with anolyte and catholyte consisting of softened water at 4° f. Intermediate compartment 300 was fed with a saturated brine 510 obtained out of 99% pure NaCl, coming from reservoir 500 containing a few titanium plates coated with a paint based on $RuO_2$; brine 510 at the outlet was recycled to tank 500, as shown in the FIGURE. Catholyte 410 was fed at a fixed flow rate of 1 l/min, while the flow rates of anolyte 210 and brine 510 were changed in the course of the various tests, all carried out upon feeding a 6 A direct current (corresponding to a current density of 1 $kA/m^2$) after connecting the positive pole of a rectifier to anode 250 and the negative pole to cathode 450. The best results in terms of efficiency of production of active chlorine were obtained with a flow-rate of anolyte 210 of 0.6 l/min and a flow rate of brine 510 of 0.7 l/min. In such conditions, it was possible to generate in continuous an oxidising solution 220 containing 65-70 ppm of free active chlorine at a pH just above 6. The test was continued for 650 hours with consistent performances. The build-up of active chlorine in recycled brine 510 was continuously monitored, obtaining a value consistently below 1 ppm/h. At the end of the test, the opening of the cell showed no visible decay in any of the components.

Counterexample

An electrolytic cell was assembled similarly to the previous example except for the anodic separator, consisting in this case of anion-exchange membrane 320 of the FAP-0 type only, without any polymer diaphragm 321 interposed. The test was carried out at the same current density, with flow rates of 0.6 l/min of anolyte 210, 1 l/min of catholyte and 0.7 l/min of brine 510. In such conditions, it was possible to generate an oxidising solution 220 in continuous containing 80 ppm of free active chlorine at a pH of about 6. During the test, a build-up of active chlorine of about 2 ppm/h was observed within recycling brine 510. The test was forcibly stopped after about 50 hours due to the sudden decay of the anionic membrane, detected through contamination by sodium ions of product solution 220. The test was repeated with a different anionic membrane (Selemion®, manufactured by Asahi Glass) with substantially similar results.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. Electrolytic cell for the production of oxidizing solutions comprising an anodic compartment containing an anode and a cathodic compartment containing a cathode with an intermediate compartment delimited by an anodic separator and a cathodic separator arranged there between, said cathodic separator interposed between said cathodic compartment and said intermediate compartment comprising a cation-exchange membrane, said anodic separator interposed between said anodic compartment and said intermediate compartment comprising a diaphragm formed by a network of organic polymer fibers mechanically bound to ceramic material particles, said diaphragm being arranged in one or more layers in intimate contact with an anion-exchange membrane, wherein said anodic separator is oriented with a major surface consisting of said diaphragm facing said anode.

2. The cell according to claim 1 wherein said diaphragm of said anodic separator is made of a 0.1 to 1 mm thick composite tape of perfluorinated polymer and zirconium oxide.

3. The cell according to claim 1, wherein said anodic compartment is provided with means for supplying water and means for extraction of an oxidising solution, said cathodic compartment is provided with means for supplying water and means for extraction of alkaline catholyte, said intermediate compartment is provided with means for recycling alkali chloride brine.

4. Method for the production of an oxidizing solution containing active chlorine in a cell according to claim 1, comprising the following simultaneous or successive steps:
supplying water to said anodic compartment and optionally to said cathodic compartment;
recycling alkali chloride brine through said intermediate compartment;
supplying direct electrical current between said anode and said cathode; and
extracting the product oxidizing solution from said anodic compartment.

5. The method according to claim 4 wherein said water supplied to said anodic and cathodic compartments has a hardness of not more than 7° f.

6. The method according to claim 5, wherein said alkali chloride brine recycling is carried out through an external reservoir containing a decomposition catalyst optionally based on $RuO_2$ or $Co_3O_4$.

7. The method according to claim 4 wherein said alkali chloride brine recycling is carried out through an external reservoir containing a decomposition catalyst optionally based on $RuO_2$ or $Co_3O_4$.

8. The method according to claim 4, wherein said oxidizing solution extracted from said anodic compartment has a pH of 4 to 6.

9. The method according to claim 4, where said alkali chloride brine is a saturated of sodium chloride brine.

* * * * *